United States Patent
Klemenz et al.

(10) Patent No.: US 10,802,810 B2
(45) Date of Patent: Oct. 13, 2020

(54) CONSUMING PERSISTENT LIBRARY BUNDLES

(71) Applicant: SAP SE, Walldorf (DE)

(72) Inventors: Oliver Klemenz, Sinsheim (DE); Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 15/390,757

(22) Filed: Dec. 27, 2016

(65) Prior Publication Data

US 2018/0181382 A1 Jun. 28, 2018

(51) Int. Cl.
*G06F 8/61* (2018.01)
*H04L 29/08* (2006.01)

(52) U.S. Cl.
CPC ............ *G06F 8/61* (2013.01); *H04L 67/34* (2013.01)

(58) Field of Classification Search
CPC ..... G06F 8/60; G06F 8/61; G06F 8/65; G06F 8/71
USPC ................................................ 717/168, 169
See application file for complete search history.

(56) References Cited

U.S. PATENT DOCUMENTS

| | | | | |
|---|---|---|---|---|
| 6,698,018 B1* | 2/2004 | Zimniewicz | ............ | G06F 8/61 717/169 |
| 7,797,697 B2* | 9/2010 | Woollen | .................... | G06F 8/61 717/170 |
| 8,347,263 B1* | 1/2013 | Offer | ........................ | G06F 8/71 717/104 |
| 8,539,488 B1* | 9/2013 | Havemose | .............. | G06F 9/547 718/100 |
| 8,997,081 B1* | 3/2015 | Manion | ..................... | G06F 8/41 717/168 |
| 9,747,091 B1* | 8/2017 | Berg | ........................ | G06F 8/61 |
| 10,496,386 B1* | 12/2019 | Ho | ..................... | G06F 9/45508 |
| 2008/0201701 A1* | 8/2008 | Hofhansl | ................. | G06F 8/60 717/168 |
| 2008/0243964 A1* | 10/2008 | Baker | ................. | G06F 9/44521 |
| 2010/0262694 A1* | 10/2010 | Havemose | ............... | G06F 8/61 709/226 |
| 2011/0072424 A1* | 3/2011 | Choi | ....................... | G06F 8/61 717/174 |
| 2011/0265077 A1* | 10/2011 | Collison | .................. | G06F 8/71 717/172 |
| 2012/0079450 A1* | 3/2012 | Reech | ...................... | G06F 8/60 717/104 |
| 2012/0240135 A1* | 9/2012 | Risbood | ............. | G06F 9/44505 719/328 |

(Continued)

*Primary Examiner* — Wei Y Zhen
*Assistant Examiner* — Brahim Bourzik
(74) *Attorney, Agent, or Firm* — Buckley, Maschoff & Talwalkar LLC (57) ABSTRACT

A persistent library bundle (PLB) is added as a library of an application. The PLB is automatically downloaded from a central registry and installed in an application directory. The PLB provides an out-of-the-box functionality to the application. The PLB includes a PLB persistence description. The PLB persistence description specifies how runtime data of the PLB has to be persisted. Upon installation of the PLB to the application, the PLB persistence description is copied to an application database directory. The application database directory stores application persistence description and the PLB persistence description. The application persistence description and the PLB persistence description are assigned to a certain database schema.

17 Claims, 7 Drawing Sheets

(56) References Cited

U.S. PATENT DOCUMENTS

2014/0337628 A1\* 11/2014 Amato ................. H04L 9/0825
                                                                               713/171
2016/0306637 A1    10/2016 Klemenz et al.

\* cited by examiner

310
```
{
  "name": "sap-aof-instance-based-auth",
  "version": "1.0.0",
  "description": "Instance Based Authorization - AOF library",
  "scripts": {
    "postinstall": "sap-aof plb-install"
  },
  "license": "SAP",
  "dependencies": {
    "sap-aof": "~1.0.0"
  }
}
```

320
```
var ObjectIdentityRole = require("./ObjectIdentityRole");
var Identity = require("./Identity");
module.exports.ObjectIdentityRole = ObjectIdentityRole;
module.exports.Identity = Identity;
```

330
```
namespace sap.aof.instance_based_auth;

Entity t_object_identity_role {
  key ID : Integer;
  IDENTITY : String(256) not null;
  OBJECT_ID : Integer not null;
  OBJECT_TYPE_CODE : String(256) not null;
  ROLE_CODE : String(256) not null;
};
```

340
```
namespace sap.aof.instance_based_auth;

Entity t_identity {
  key USER_NAME : String(256);
  CREATED_AT : UTCDateTime not null;
  CREATED_BY : String(256) not null;
  CHANGED_AT : UTCDateTime not null;
  CHANGED_BY : String(256) not null;
  NAME : String(256);
  EMAIL : String(256);
  createdBy : Association[1] to t_identity on
    createdBy.USER_NAME = CREATED_BY;
  changedBy : Association[1] to t_identity on
    changedBy.USER_NAME = CHANGED_BY;
};
```

```
var Check = require("sap-aof").Check;

module.exports.Role = {
   Owner: "sap.aof.instance_based_auth.Owner",
   Reader: "sap.aof.instance_based_auth.Reader",
   Writer: "sap.aof.instance_based_auth.Writer",
   Admin: "sap.aof.instance_based_auth.Admin"
};

module.exports.node = function (sObjectType, sRole, bReadOnly) {
   return {
      table: "sap.aof.instance_based_auth::t_object_identity_role",
      sequence: "sap.aof.instance_based_auth::s_object_identity_role",
      parentKey: "OBJECT_ID",
      readOnly: bReadOnly,
      consistencyChecks: [Check.duplicateCheck("IDENTITY", "MSG_DUPLICATE)],
      attributes: {
         OBJECT_TYPE_CODE: {
            constantKey: sObjectType
         },
         ROLE_CODE: {
            constantKey: sRole
         },
         IDENTITY: {
            foreignKeyTo:
              "node_modules.sap-aof-instance-based-auth.js.Identity.Root"
         }
      }
   };
};
```

CONSUMING PERSISTENT LIBRARY BUNDLES

FIELD

Embodiments described herein relate to software program development, maintenance, and installation. Further, tools and techniques for joining files or modules residing in libraries to create executable program code are described.

BACKGROUND

Modularization is a well-known concept in software development. Modules providing out-of-the-box functionalities can be included in a software project to ease software development. Such modules are often referred to as libraries. Libraries are designed to assist developers in building software. A library can include pre-written source code of one or more of classes, procedures, scripts, configuration data, etc. Typically, a developer adds a library to a software application to avoid writing source code for a functionality. For example, a library providing user authentication functionality can be added to the application instead of re-developing the authentication functionality in the application.

Assuring application data persistence is an important part of application development. Applications persist runtime data so the data can be accessed after the applications are closed. For example, an application for editing text documents can store the edited document in a text file before exiting. Typically, applications' source code includes portions specifying transfer of data to storage memory devices, and mappings between program objects to data structures.

Once an application is restarted, persisted data can be loaded in the application runtime from memory. However, functionalities provided to the application via libraries are not persisted and thus the functionalities have to be repeatedly invoked at application restart to be loaded in the execution environment. This is time consuming and may significantly reduce application performance.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for building and consuming persistent library bundles are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
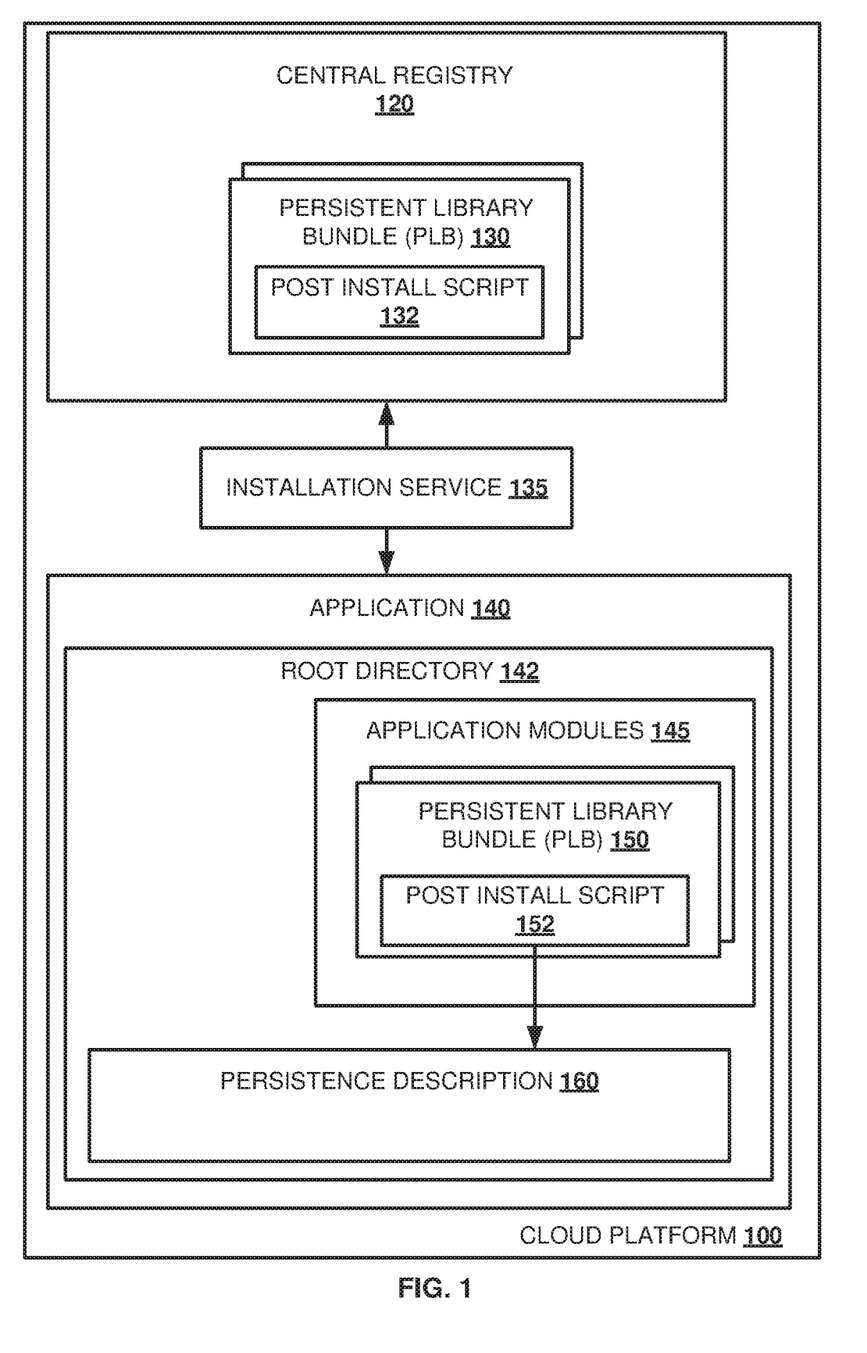
FIG. 1 is a block diagram illustrating a cloud platform to consume persistent library bundles (PLBs), according to one embodiment.

FIG. 1 is a block diagram illustrating cloud platform 100 to consume persistent library bundles, according to one embodiment. Cloud platform 100 can be viewed as including a physical layer and an abstraction layer. The physical layer may include hardware resources to support cloud services being provided, and typically includes a server, a storage unit, network components, etc. The abstraction layer may include software components deployed across the physical layer that manifest functionalities provided by cloud platform 100. For example, cloud platform 100 may provide application runtime, user interface (UI) development toolkits, internal configurations, and one or more cloud services such as a connectivity service, a database access service, a persistence service, an identity service, a feedback service, a document service, etc. The functionality provided by cloud platform 100 can be utilized by customers of cloud platform 100 to develop and/or deploy software applications on cloud platform 100. A customer utilizing cloud platform 100 to develop application 140 consumes PLB 130 by adding a ready-to-use functionality provided by PLB 130. Thus, the customer avoids redeveloping the functionality for further applications developed via cloud platform 100.

In one embodiment, cloud platform 100 may also provide support for other application lifecycle processes, for example, provisioning, installation, deployment and maintenance of applications. In one embodiment, cloud platform 100 may be a platform-as-a-service (PaaS). In one embodiment, cloud platform 100 includes central registry 120 and installation service 135. Further, application 140 is developed and installed on cloud platform 100.

In one embodiment, central registry 120 is an internal repository of cloud platform 100. It should be appreciated, however, that central registry 120 can also be an external registry that is accessible through a public network such as the Internet. In one embodiment, central registry 120 includes at least one persistent library bundle (PLB) such as PLB 130. In one embodiment, PLBs (e.g., 130) included in central registry 120 may be shared for downloading by multiple applications, both internal (developed and deployed on cloud platform 100) and external (developed and deployed outside of cloud platform 100). A shared PLB can be added to a third party application. PLBs to be added to an application are specified during the development of the application. The specified PLBs can be automatically downloaded from central registry 120 when the developed applications are compiled.

In one embodiment, central registry 120 reads data for libraries and/or PLBs uploaded to the registry (e.g., from metadata files corresponding to the libraries/PLBs). Further, the registry may support one or more application programming interfaces (APIs) that enable publishing libraries/PLBs and corresponding data and managing account information for users that upload the libraries/PLBs to the registry. The registry can be associated with a corresponding database where the uploaded libraries/PLBs and the corresponding data can be stored.

In one embodiment, installation service 135 is a cloud service provided by cloud platform 100. Installation service 135 is associated with central registry 120. Installation service 135 is configured to automatically install the specified PLBs to corresponding applications at applications' compilation. Installation service 135 automatically downloads the specified PLBs from central registry 120 to directories of the corresponding applications. In one embodiment, PLB 130 is a persistent library bundle that is specified during development of application 140, among other libraries and/or PLBs. PLB 130 includes post install script 132. In one embodiment, post install script 132 defines one or more actions to be performed when installation of PLB 130 with an application (e.g., 140) is completed. When application 140 is compiled, installation service 135 may automatically download PLB 130 from central registry 120. Installation service 135 may install PLB 130 as part of application 140.

In one embodiment, a PLB provides a certain, e.g., out-of-the-box, functionality. For example, PLB 130 may provide an instance-based user authentication functionality for a number of application instances that run simultaneously. PLB 130 can be viewed as a library that may be added to different applications, including application 140, and allows to avoid writing same or similar source code for the instance-based user authentication functionality per application. A user may have different access rights for a first application instance (e.g., read and write) and a second application instance (e.g., read). The necessary rights of the user per different instances can be determined at application runtime via the PLB's instance-based user authentication functionality. In one embodiment, during development of application 140, PLB 130 is defined as a module that application 140 depends on for the instance-based user authentication functionality that is readily provided by PLB 130. When application 140 is compiled, pre-defined dependencies (e.g., PLB 130) may be automatically downloaded from central registry 120 and installed to a directory of application 140.

In one embodiment, when application 140 is compiled, application specific files are installed in root directory 142 that corresponds to application 140. In various embodiments, the application specific files may include one or more of configuration files, executable files, archives, packages of pre-written source code, files for code structuring and encapsulation, assets (e.g., texts, images), description files, persistence logic, etc. The application specific files are herein referred to as application artifacts. The application artifacts stored in root directory 142 are pertinent to application 140. In one embodiment, root directory 142 may not exist during development of application 140 and, therefore, may be automatically created when application 140 is compiled.

In one embodiment, root directory 142 includes one or more subdirectories. The one or more subdirectories may store different artifacts of application 140, depending on the purpose served by the application artifacts. In one embodiment, root directory 142 includes application modules 145 and persistence description 160. For example, application modules 145 and persistence description 160 can be subdirectories of root directory 142. Artifacts of the libraries and PLBs (including artifacts of PLB 130) downloaded to application 140 are stored in application modules 145. Similarly, artifacts associated with persisting data of application 140 are stored in persistence description 160.

In one embodiment, application modules 145 store PLB 150, among other modules of application 140. PLB 150 corresponds to PLB 130. PLB 130 is downloaded from central registry 120 when application 140 is compiled. PLB 150 represents a downloaded version of PLB 130 that is installed in application modules 145. PLB 150 provides the out-of-the-box instance-based user authentication functionality to application 140, according to one embodiment. PLB 150 includes a number of artifacts providing different application functionalities such as user authentication. The PLB 150 artifacts may include a description file (e.g., specifying at least a name, a version, and one or more references to scripts and/or other modules required in PLB 150), one or more persistence description artifacts and pre-written source code specifying the functionality of PLB 150. The PLB 150 artifacts may also include additional arbitrary files such as configuration files, files for code structuring and encapsulation, assets (e.g., texts, images), etc.

The one or more PLB 150 persistence description artifacts define, for example, how data calculated by the authentication functionality can be persisted at application 140 runtime. For example, based on the instance-based user authentication functionality, rights of a user to access and/or edit different running instances of application 140 can be determined. In one embodiment, at application 140 compile time, the one or more PLB 150 persistence description artifacts are automatically installed in application modules 145 together with other artifacts of PLB 150. Additionally, the PLB 150 artifacts may include post install script 152. Post install script 152 is a script that describes one or more actions to be performed after PLB 150 installation is complete. A post installation (install) script is automatically executed upon completion of installation of a library that includes the post installation script. Thus, installation service 135 of cloud platform 100 can be instructed via the post install script 152 to automatically perform various actions upon installation of PLB 150.

In one embodiment, installation service 135 is configured to execute post install script 152 when the PLB artifacts are installed. Based on the execution of post install script 152, the one or more PLB 150 persistence artifacts may be transferred from application modules 145 to persistence description 160.

In one embodiment, persistence description 160 includes one or more application artifacts associated with persisting data of application 140. The one or more persistence artifacts of application 140 ensure persistence of runtime data of application 140. For example, the one or more persistence artifacts of application 140 may store mappings of programming structures of application 140 to data structures of a memory device (e.g., the storage unit of cloud platform 100).

In one embodiment, upon execution of post install script 152, persistence description 160 includes the one or more artifacts associated with persisting data of application 140, as well as the one or more PLB 150 persistence artifacts. Runtime data of application 140 is stored (e.g., in the storage unit of cloud platform 100) in accordance with the artifacts included in persistence description 160. Artifacts in persistence description 160 may be assigned to a corresponding database schema when application 140 is deployed on cloud platform 100.

In one embodiment, when application 140 is deployed and running, application 140 persistence artifacts define an application persistence abstraction layer of application 140.

Since the artifacts in persistence description 160 are assigned to one database schema, the application persistence abstraction layer also includes the PLB persistence defined by the PLB 150 persistence artifacts.

Figure 2:
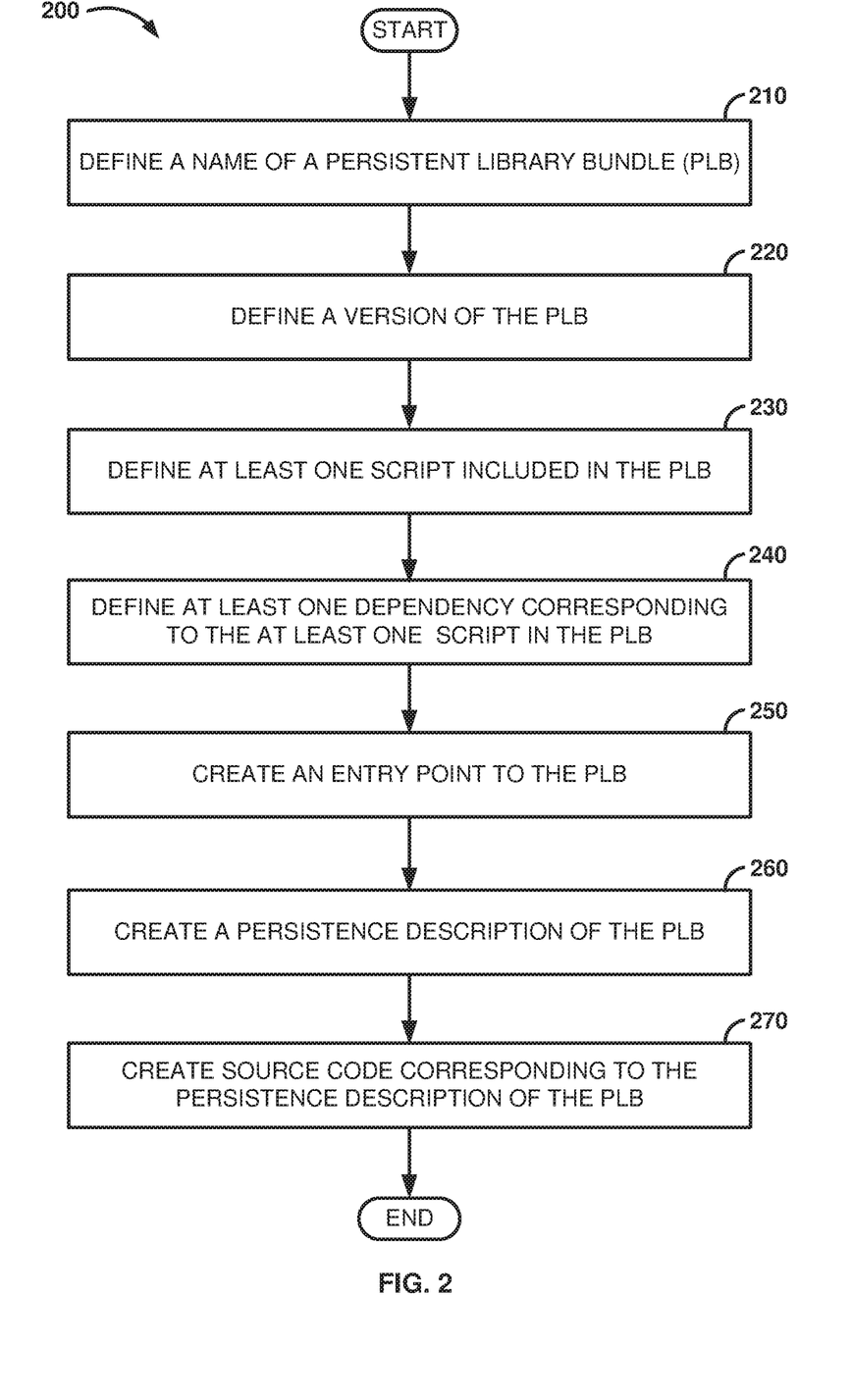
FIG. 2 is a flow diagram illustrating a process to create a PLB, according to one embodiment.

FIG. 2 is a flow diagram illustrating a process 200 to create a persistent library bundle (PLB), according to one embodiment. At 210, a name of the PLB is defined. A description file can be created as part of the PLB. The description file can include the name of the PLB. Depending on requirements of a runtime environment utilized for creation of the PLB, the description file can be created in different file formats. For example, the description file can be a "package.json" file when the PLB is created in a Node.js® environment. In one embodiment, different applications reference different versions of the PLB. Thus, defining a current version of the PLB is a necessary step in process 200 to create the PLB. At 220, the version of the PLB is defined. Next, at 230, at least one executable script is defined for the PLB. Scripts defined in a PLB describe operations to be performed during or upon the initial installation of the PLB in a corresponding application. For example, the PLB may include a post installation script (such as post install script 152 described above with reference to FIG. 1) that describes an operation to transfer PLB persistence artifacts to a persistence directory of the corresponding application. The transfer operation to be performed upon completion of the initial installation of the PLB. In one embodiment, the version of the PLB and the at least one script of the PLB are defined in the description file that includes the name of the PLB.

Next, at 240, at least one dependency to the at least one script is defined in the PLB. For example, an additional functionality may be necessary for the execution of the at least one script. The additional functionality can be added as an external module that is required by the PLB. At 250, an entry point to the PLB is created. For example, when the PLB is created in the Node.js environment, an "index.js" file represents the PLB entry point. The entry point exposes an external interface to the PLB, according to one embodiment. Artifacts included in the PLB can be referenced by the PLB entry point and exposed when required by a consumer of the PLB.

In one embodiment, the PLB represents a module providing an instance-based user authentication functionality. The PLB can be added to an application to automatically provide the instance-based user authentication functionality to the application. At 260, a persistence description of the PLB is created. The persistence description defines how runtime data calculated by a given application functionality (e.g., user authentication) has to be persisted. In one embodiment, the PLB includes one or more PLB persistence artifacts. When the persistence description of the PLB is created, at 270, corresponding source code specifying the instance-based user authentication functionality of the PLB is created.

Figure 3:
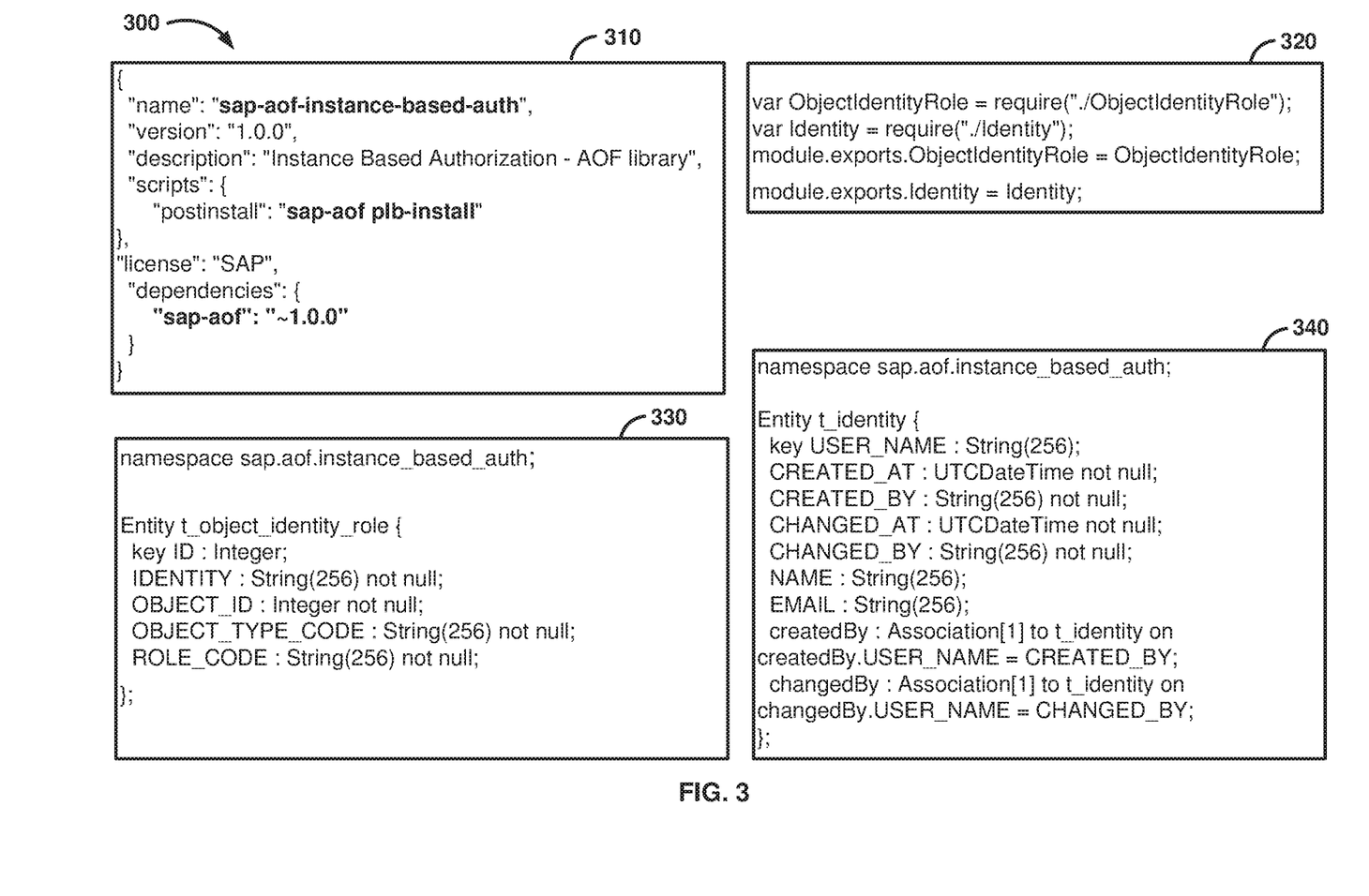
FIG. 3 is an exemplary source code representing artifacts of a PLB, according to one embodiment.

FIG. 3 is an exemplary source code 300 representing artifacts of a PLB, according to one embodiment. Exemplary source code 300 includes a first portion 310, a second portion 320, a third portion 330, and a fourth portion 340 of source code. First portion 310 of source code specifies a name and a version of the PLB, according to one embodiment. Additionally, first portion 310 of source code specifies a post installation script to be included in the PLB. In one embodiment, first portion 310 of source code represents an exemplary implementation of steps 210-240 of process 200 described above with reference to FIG. 2. In one embodiment, the PLB is created in Node.js environment. First portion 310 of source code represents a "package.json" file of the PLB.

In one embodiment, second portion 320 of source code exposes a public interface to the PLB. Second portion 320 of source code represents an entry point into the PLB. Second portion 320 of source code can be viewed as a main function of the PLB that is started when an application including the PLB is compiled. In response to starting the main function, source code portions of the PLB can be loaded during compilation of the application. Second portion 320 of source code specifies an exemplary implementation of step 250 of process 200 (FIG. 2). For example, second portion 320 of source code represents an "index.js" file of the PLB created in the Node.js environment.

Third portion 330 and fourth portion 340 of source code specify a persistence description of the PLB, according to one embodiment. For example, third portion 330 and fourth portion 340 of source code represent two separate PLB artifacts that refer to a unique namespace, namely "sap.aof.instance_based_auth". Based on the namespace, the two artifacts can be deployed to a common folder under one database schema. Thus, interaction at runtime between the artifacts under the database schema will be possible.

Figure 4A:
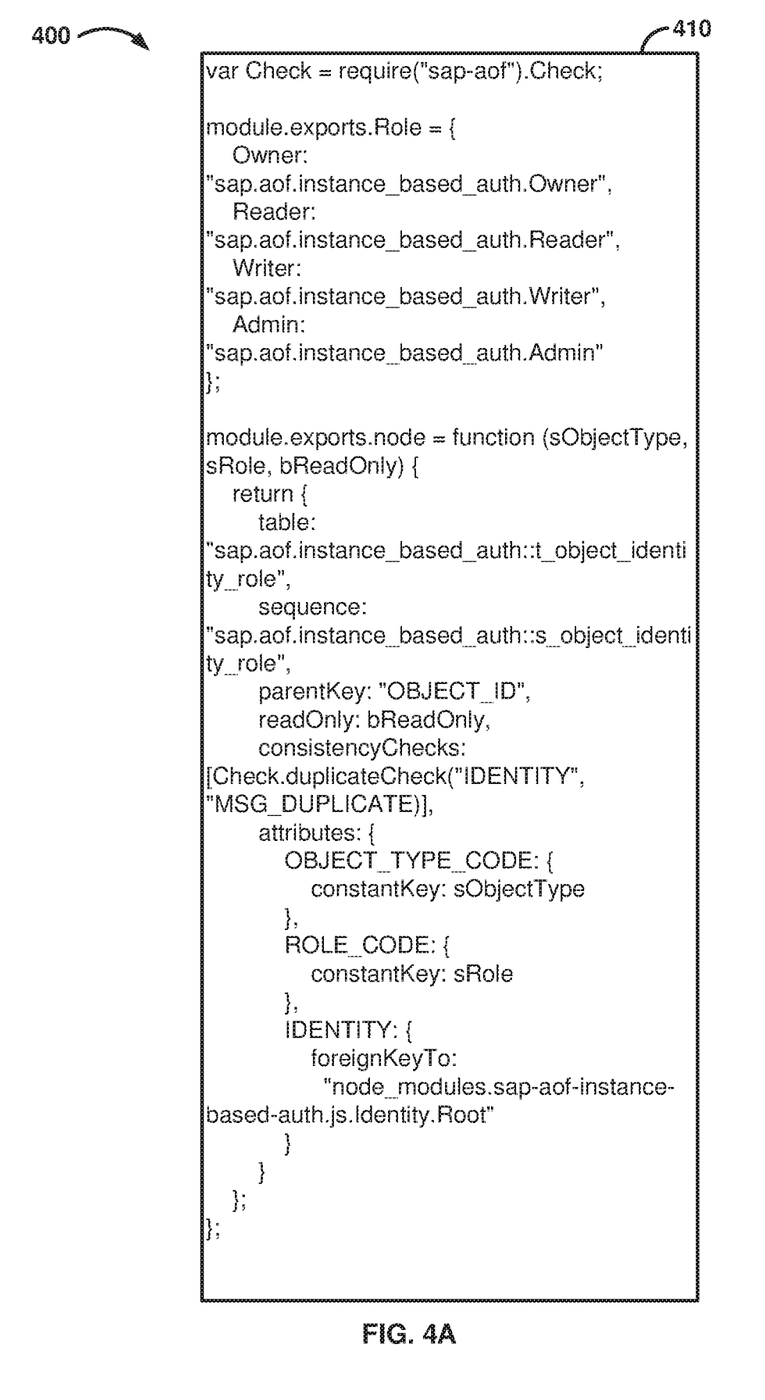
FIGS. 4A-4B are portions of an exemplary source code specifying an instance based user authentication functionality of a PLB, according to one embodiment.
Figure 4B:
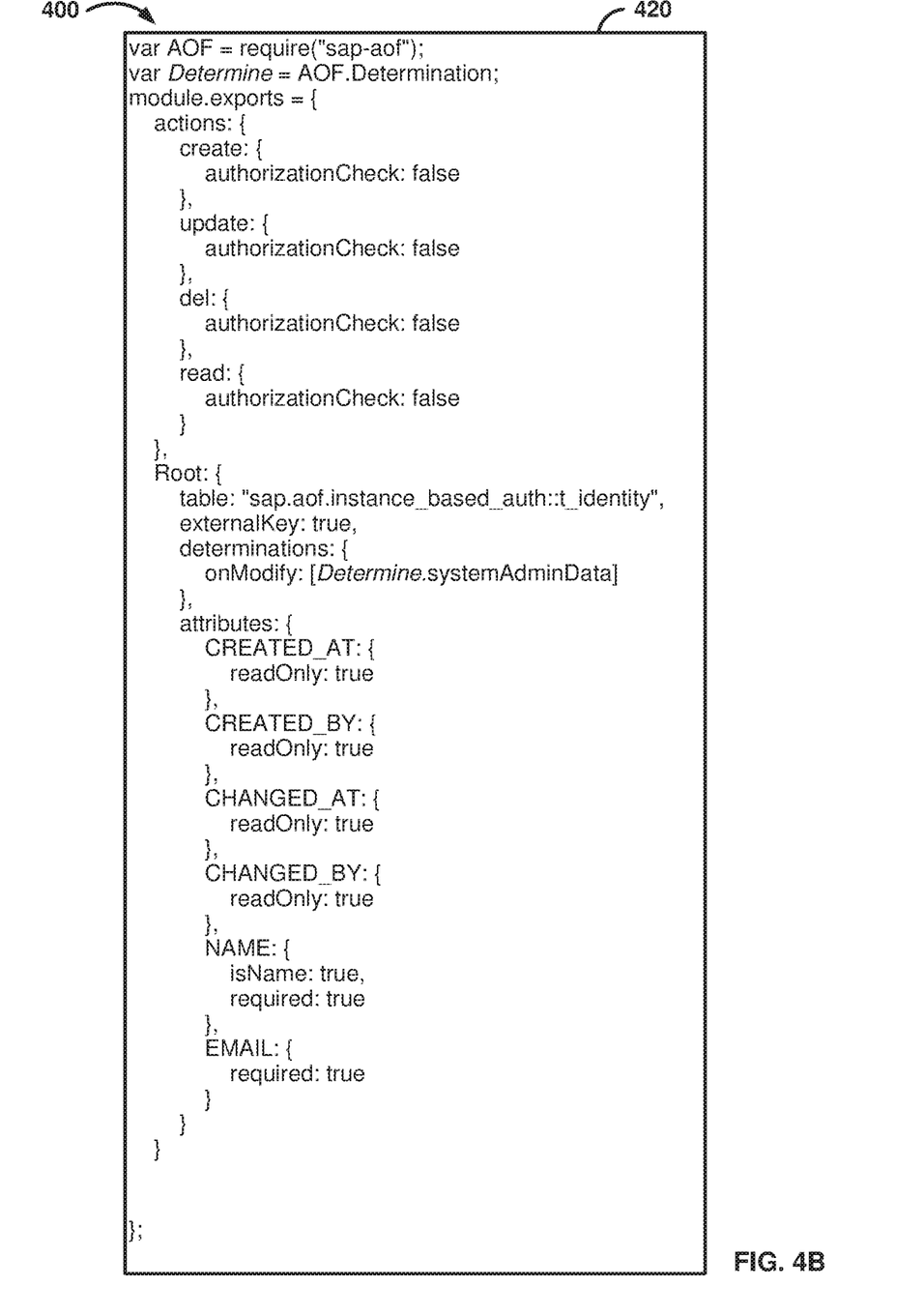

FIGS. 4A-4B are portions of an exemplary source code 400 specifying an instance-based user authentication functionality of a PLB, according to one embodiment. Rights of a user to access and/or edit different instances of an application are determined based on the instance-based user authentication functionality. Exemplary source code 400 includes a first portion 410 (FIG. 4A) and a second portion 420 (FIG. 4B) of source code. Exemplary source code 400 specifies an exemplary implementation of step 270 of process 200 described above with reference to FIG. 2.

Figure 5:
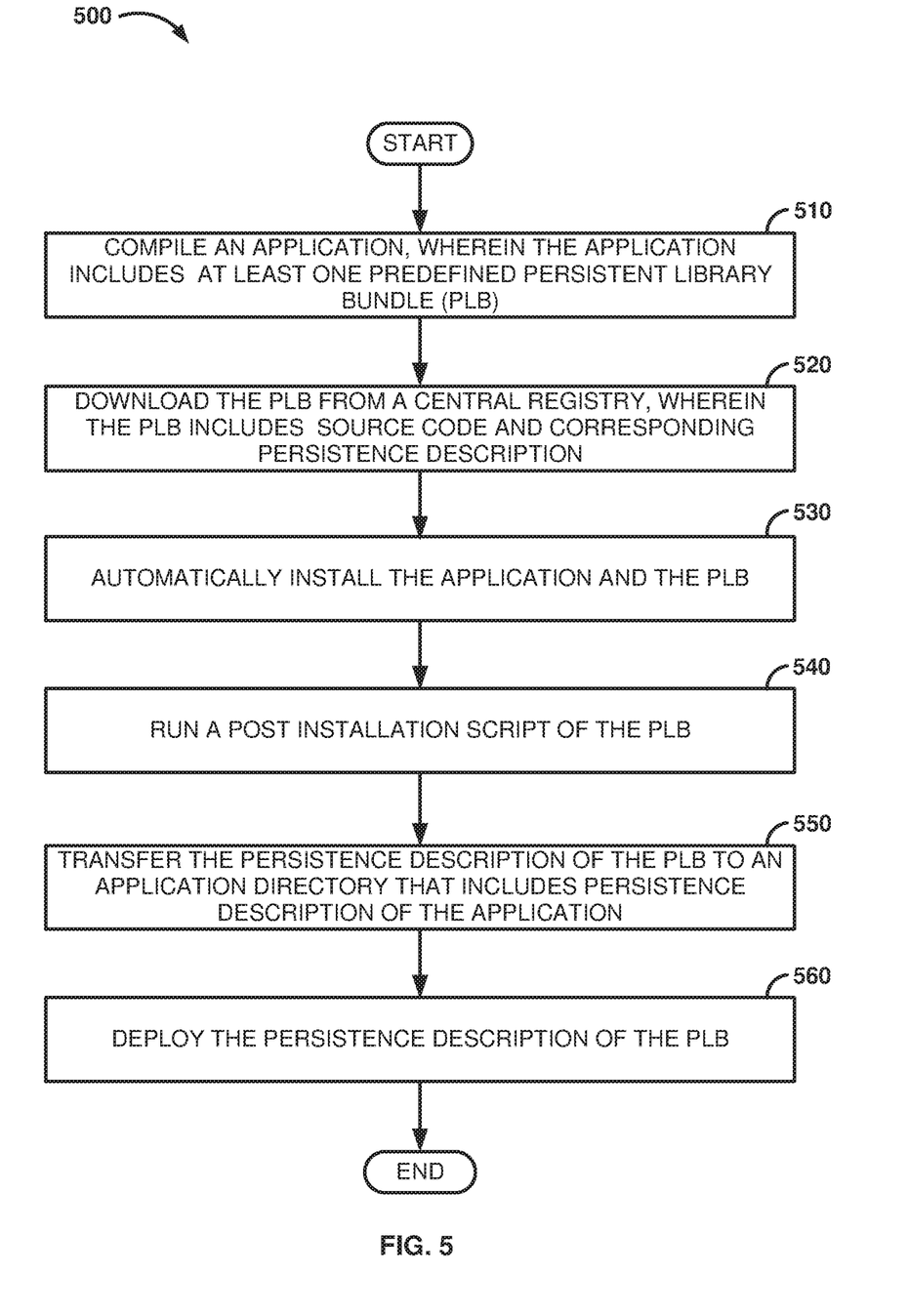
FIG. 5 is a flow diagram illustrating a process to consume a PLB, according to one embodiment.

FIG. 5 is a flow diagram illustrating a process 500 to consume a PLB, according to one embodiment.

At 510, an application is compiled. The application includes at least one persistent library bundle (PLB) predefined during development of the application. In one embodiment, the application is based on one or more predefined libraries and/or persistent library bundles (PLBs) that include pre-written portions of source code and provide out-of-the-box functionalities. For example, the PLB consumed by the application provides an instance-based user authentication functionality. Adding the PLB as a dependency of the application during development allows to avoid writing same or similar source code for the instance-based user authentication functionality per application. When the application is compiled, at 520, the PLB is downloaded from a central registry. For example, the central registry can be either publicly accessible through the Internet or internal for an organization. Further, the central registry can be part of a cloud platform, together with an installation service that automatically downloads the PLB. The PLB includes a portion of source code specifying the instance-based user authentication functionality and corresponding persistence description, according to one embodiment.

At 530, the application is automatically installed. The PLB is automatically installed when the application is installed. In one embodiment, the application is installed on cloud platform 100 described above with reference to FIG. 1. In one embodiment, the installation includes downloading the at least one predefined PLB to an application directory residing on storage of cloud platform 100. The application directory storing downloaded versions of predefined PLBs and other libraries of the application. When the PLB is installed, at 540, a post installation script of the PLB (e.g., post install script 152 described above with reference to FIG. 1) is run to transfer the persistence description of the PLB to a persistence description directory of the application. For example, the installation service automatically installs the application and the PLB, and runs the post installation script. In one embodiment, the application directory that stores the downloaded versions of the predefined PLBs and libraries and the persistence description directory are subdirectories of a main (root) directory of the application.

In one embodiment, the persistence description directory of the application includes a number of artifacts assuring persistence of runtime data of the application. Thus, to enable persistence of runtime data calculated by the instance-based user authentication functionality provided by the PLB, the PLB persistence description is transferred, at 550, to the persistence description directory of the application. Since the PLB persistence description is part of the application persistence description, when the application is deployed (e.g., to cloud platform 100 described above with reference to FIG. 1), at 560, the persistence description of the PLB is also deployed.

By including transient executable source code and corresponding persistence description artifacts in a persistent library bundle (PLB), a new category of libraries (e.g., persistent libraries) is created. A persistent library can persist data beyond application runtime. Thus, the runtime data of the PLB endures the runtime context of the application and is stored in a database.

A PLB can be shipped as a ready-to-use component and can be added out-of-the-box to a development project. Thus, code reuse is enabled for software modules/libraries required to provide persistence to store runtime data. This way, a portion of source code provided by a library can be executed multiple times and data of each execution can be accessed separately.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 6:
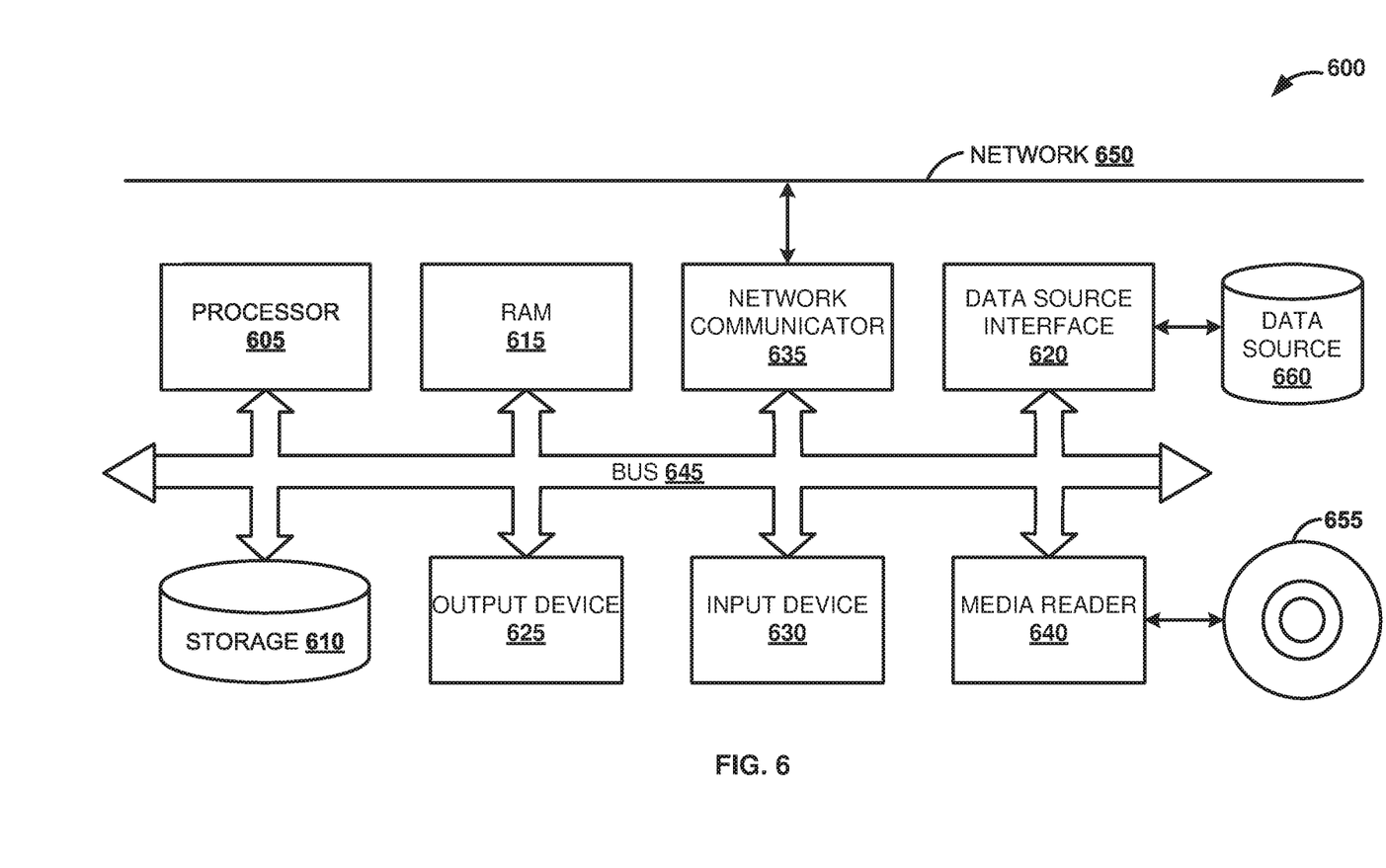
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method to consume a persistent library bundle (PLB), the method comprising:
   creating a persistent library bundle (PLB), the PLB including PLB persistence description artifacts defining how data calculated by an execution of the PLB is to be persisted at an application runtime and a description file including a name for the PLB, a version for the PLB, and at least one script to be performed during or upon an installation of the PLB in an application;
   adding the PLB to an application, wherein the PLB generates runtime data;
   installing, automatically during an installation of the application on a cloud platform, the PLB as an application module within a root directory of the application on the cloud platform, wherein the at least one script of the PLB comprises a post installation script specifying one or more actions to be performed after installation of the PLB is complete; and
   automatically executing, in response to the installation, the post installation script of the PLB, the execution comprising:
      transferring, based on the execution of the post installation script, the PLB persistence description artifacts from the application module to the root directory of the application, the root directory storing application persistence description artifacts defining how runtime data generated by the application is to be persisted to ensure persistence of runtime data of the application and, based on the transfer of the PLB persistence description artifacts, PLB persistence artifacts PLB to ensure persistence of the runtime data generated by the PLB; and
      deploying the application on the cloud platform, the deploying of the application including the deployment of the application persistence description artifacts and the PLB persistence description artifacts.

2. The method of claim 1, wherein installing the PLB further comprises:
   downloading the PLB from a central registry.

3. The method of claim 1, wherein adding the PLB to the application further comprises:
   defining one or more libraries of the application.

4. The method of claim 1, wherein the application persistence description artifacts and the PLB persistence description artifacts are assigned to a certain database schema.

5. The method of claim 1, wherein the PLB provides an out-of-the-box functionality to the application.

6. The method of claim 5, wherein the PLB comprises reusable source code bundled with the PLB persistence description.

7. A computer system to consume a persistent library bundle (PLB), the system comprising:
   at least one processor and memory that execute program code, the program code comprising:
      a central registry that stores a PLB created to include PLB persistence description artifacts defining how data calculated by an execution of the PLB is to be persisted at an application runtime and a description file including a name for the PLB, a version for the PLB, wherein the PLB generates runtime data, and wherein the PLB comprises a post installation script specifying one or more actions to be performed after installation of the PLB is complete; and
      an installation service that automatically installs, during an installation of the application on a cloud platform, the PLB as an application module within a root directory of the application on the cloud platform,
      wherein the post installation script transfers, based on an execution of the post installation script, the PLB persistence description artifacts from the application module to the root directory of the application, the root directory storing application persistence description artifacts defining how runtime data generated by the application is to be persisted to ensure persistence of runtime data of the application and, based on the transfer of the PLB persistence description artifacts, PLB persistence description artifacts to ensure persistence of the runtime data generated by the PLB and deploys the application on the cloud platform, the deploying of the application including the deployment of the application persistence description artifacts and the PLB persistence description artifacts.

8. The system of claim 7, wherein the application persistence description artifacts and the PLB persistence description artifacts are assigned to a certain database schema.

9. The system of claim 7, wherein the installation service further downloads the PLB from the central registry.

10. The system of claim 7, wherein the PLB provides an out-of-the-box functionality to the application.

11. The system of claim 10, wherein the PLB comprises reusable source code bundled with the PLB persistence description.

12. A non-transitory computer readable medium storing instructions which when executed by at least processor cause a computer system to perform operations comprising;
   create a persistent library bundle (PLB), the PLB including PLB persistence description artifacts defining how data calculated by an execution of the PLB is to be persisted at an application runtime and a description file including a name for the PLB, a version for the PLB, and at least one script to be performed during or upon an installation of the PLB in an application;
   add a PLB to an application, wherein the PLB generates runtime data;
   install, automatically during an installation of the application on a cloud platform, the PLB as an application module within a root directory of the application on the cloud platform, wherein the at least one script of the PLB comprises a post installation script one or more actions to be performed after installation of the PLB is complete; and
   automatically execute, in response to the installation, the post installation script of the PLB, the execution comprising:
      transfer, based on the execution of the post installation script, of the PLB persistence description artifacts from the application module to the root directory of the application, the directory storing application persistence description artifacts defining how runtime data generated by an application is to be persisted to ensure persistence of runtime data of the application and, based on the transfer of the PLB persistence description artifacts, PLB persistence artifacts to ensure persistence of runtime data of the application and persistence of the runtime data generated by the PLB; and
   deploy the application on the cloud platform, the deploying of the application including the deployment of the application persistence description artifacts and the PLB persistence description artifacts.

13. The computer readable medium of claim 12, wherein install the PLB further comprises:
   download the PLB from a central registry.

14. The computer readable medium of claim 12, wherein add the PLB to the application further comprises:
   define one or more libraries of the application.

15. The computer readable medium of claim 12, wherein the application persistence description artifacts and the PLB persistence description artifacts are assigned to a certain database schema.

16. The computer readable medium of claim 12, wherein the PLB provides an out-of-the-box functionality to the application.

17. The computer readable medium of claim 16, wherein the PLB comprises reusable source code bundled with the PLB persistence description.

* * * * *